United States Patent Office 3,019,244
Patented Jan. 30, 1962

3,019,244
11α-ALLYLATED 11β-HYDROXY-5β-PREGNANE-3,20-DIONE BISOXIMES AND PROCESS
John C. Babcock, Portage Township, Kalamazoo County, and William J. Wechter, Kalamazoo, Mich., assignors to The Upjohn Company, Kalamazoo, Mich., a corporation of Delaware
No Drawing. Filed June 12, 1959, Ser. No. 819,837
6 Claims. (Cl. 260—397.5)

The present invention relates to novel 11α-allylated 11β-hydroxy-5β-pregnane-3,20-dione bisoximes and is more particularly concerned with 11α-allyl-11β-hydroxy-5β-pregnane-3,20-dione bisoxime and 11α-methallyl-11β-hydroxy-5β-pregnane-3,20-dione bisoxime.

The novel compounds and the process of the present invention are illustratively represented by the following formulae:

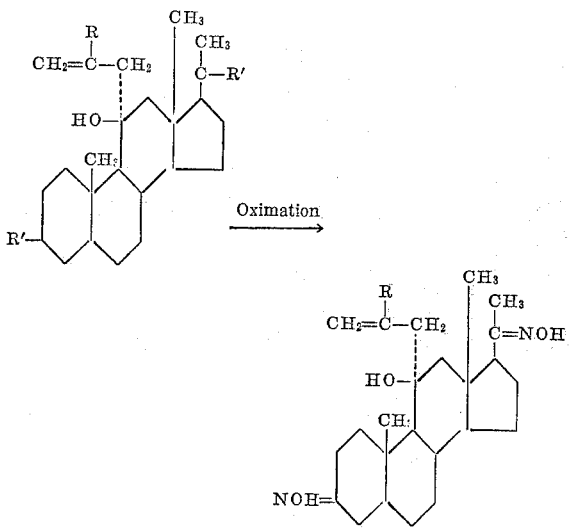

wherein R is hydroegn or methyl and R' is carbonyl oxygen (=O) or a cyclic ketal radical of the formula

wherein R'' is an alkylene radical containing not more than 8 carbon atoms, inclusive, and the attaching oxygen to carbon bonds are separated by a chain of at least 2 and not more than 3 carbon atoms, e.g., ethylene, 1,2-propylene, 1,3-propylene, 2,2-dimethyltrimethylene, 1,2-butylene, 1,3-butylene, 2,3-butylene, 2,4-amylene, 4-methyl-1,2-amylene, 6-methyl-1,3-hexylene, 1,2-heptylene, 3,4-heptylene, 1,3-octylene, etc.

The compounds of the present invention are prepared from the corresponding 3,20-bis(alkylene ketals) or from the corresponding 3,20-diketo compounds by oximation, e.g., using hydroxylamine hydrochloride.

The compounds of the present invention, i.e., 11α-allyl-11β-hydroxy-5β-pregnane-3,20-dione bisoxime and 11α-methallyl-11β-hydroxy-5β-pregnane-3,20 - dione bisoxime, are central nervous system depressants useful as tranquilizers, muscle relaxants, and sedatives in the treatment of hypertension, nervous disorders and related illnesses in both humans and valuable domestic animals.

The compounds of the present invention have the advantage over the corresponding 3,20-diketo compounds in that they possess greatly increased central nervous system depressant activity. For example, a compound of the present invention, 11α-allyl-11β-hydroxy-5β-pregnane-3,20-dione bisoxime, when administered intraperitoneally to mice at a dose of 300 mg./kg. induced sleep for more than 24 hours, whereas the corresponding 3,20-diketo compound, 11α-allyl-11β-hydroxy-5β-pregnane-3,20-dione, when administered to mice under like conditions at 300 mg./kg. induced sleep for only 3 hours.

The compounds of the present invention can be prepared and administered to the animal organism in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

Starting materials for the process of the present invention are 11α-allyl-11β-hydroxy-5β-pregnane-3,20-dione bis(alkylene ketal), 11α-methallyl-11β-hydroxy-5β-pregnane-3,20-dione bis(alkylene ketal) and the corresponding 3,20-diketo compounds, which are prepared from the corresponding 5β-pregnane-3,11,20-trione-3,20-bis(alkylene ketals) according to the procedure of copending application Serial No. 792,725. The 5β-pregnane-3,11,20-trione 3,20-bis(alkylene ketals) are also prepared according to the method disclosed in co-pending application Serial No. 792,725, now U.S. Patent No. 2,897,198 by reacting at reflux temperature 5β-pregnane-3,11,20-trione in toluene, benzene, hexane, heptane or other organic solvents, with ethylene glycol or other alkane diols of the formula:

wherein R'' is an alkylene radical containing not more than 8 carbon atoms, inclusive, and the attaching oxygen to carbon bonds are separated by a chain of at least 2 and not more than 3 carbon atoms, for example, the alkylene radicals previously listed, in the presence of a strong acid such as paratoluenesulfonic acid, ortho-chlorobenzenesulfonic acid, sulfuric acid, and the like, to obtain the corresponding 5β-pregnane-3,11,20-trione 3,20-bis(alkylene ketal). Representative 5β-pregnane-3,11,20-trione 3,20-bis(alkylene ketals) produced include 5β-pregnane-3,11,20-trione 3,20-bis(ethylene ketal); 3,20-bis(1,2-propylene ketal); 3,20-bis(1,3-propylene ketal); 3,20-bis(2,2-dimethyltrimethylene ketal); 3,20-bis(2,3-butylene ketal); 3,20-bis(1,3-hexylene ketal), and the like.

The process of the present invention comprises treating an 11α-allylated 11β-hydroxy-5β-pregnane-3,20-dione bis(alkylene ketal) with a hydroxylamine mineral acid salt, such as, hydroxylamine hydrochloride or hydroxylamine sulfate, in a suitable solvent, such as, an alkanol, a tertiary amine, for example, pyridine, collidine, N,N-dimethylaniline and the like, or preferably an alkanol in the presence of a basic reagent such as a tertiary amine to give the corresponding 11α-allylated 11β-hydroxy-5β-pregnane-3,20-dione bisoxime. This process can be referred to broadly as oximation. An excess of hydroxylamine, usually from two to six molar equivalents is preferably employed. The preferred hydroxylamine mineral acid salt is hydroxylamine hydrochloride and the preferred basic reagent is pyridine.

Alternatively, the oximation can be carried out using the 3,20-diketo compounds instead of the 3,20-bisketals. Thus, the 11α-allylated 11β-hydroxy-5β-pregnane-3,20-dione bisoximes of the present invention can be prepared from the corresponding 3,20-diketo steroids by treating an 11α-allylated 11β-hydroxy-5β-pregnene-3,20-dione directly with hydroxylamine, preferably in a suitable solvent such as an alkanol or amine, or with a hydroxylamine mineral acid salt, such as hydroxylamine hydrochloride or hydroxylamine sulfate in solution in an amine such as pyridine or morpholine, wherein the amine serves as a base, or in alcohol or other suitable organic solvent in the presence of an amine such as pyridine, collidine, and the like, or in the presence of an alkali metal base such as sodium acetate, potassium hydroxide, potassium carbonate, and the like.

The oximation reaction is preferably carried out at 20 to 120° C., and conveniently at the reflux temperature of the reaction mixture. Under these conditions the reaction time is usually from 15 minutes to 8 hours. Both higher and lower temperatures and shorter and longer reaction times are operative, the lower temperature usually requiring a correspondingly longer reaction time.

The 11α-allylated 11β-hydroxy-5β-pregnane-3,20-dione bisoxime, thus produced, can be isolated from the reaction mixture by conventional methods, for example, by pouring the reaction mixture into water and separating the resultant precipitate by filtration. Additional purification of the product can be accomplished by conventional methods, for example, by recrystallization from a suitable solvent or mixture of solvents, such as, methanol, dilute methanol, ethanol, ether, methylene chloride, methylene chloride-Skellysolve B hexanes, and the like.

The following examples are illustrative of the products and process of the present invention and are not to be construed as limiting.

EXAMPLE 1

*11α-allyl-11β-hydroxy-5β-pregnane-3,20-dione bisoxime*

A mixture of 10 g. of 11α-allyl-11β-hydroxy-5β-pregnane-3,20-dione bis(ethylene ketal) and 10 g. of hydroxylamine hydrochloride in 50 ml. of dry pyridine and 50 ml. of absolute ethanol was heated to reflux temperature for 6 hours. The solution thus obtained was then poured into 1.5 l. of ice water and refrigerated for three hours. The precipitate thus obtained was collected on a sintered glass funnel, washed thoroughly with water and dried in a vacuum oven giving crude 11α-allyl-11β-hydroxy-5β-pregnane-3,20-dione bisoxime, a white solid. The crude product was then recrystallized from methylene chloride-Skellysolve B hexanes giving 6.1 g. (70% yield) of 11α-allyl-11β-hydroxy-5β-pregnane-3,20-dione bisoxime melting at 148 to 154° C. A second crop of 990 mg. (11% yield) of crystals of 11α-allyl-11β-hydroxy-5β-pregnene-3,20-dione bisoxime was obtained. An analytical sample was prepared by recrystallizing 11α-allyl-11β-hydroxy-5β-pregnane-3,20-dione bisoxime twice from methylene chloride giving 11α-allyl-11β-hydroxy-5β-pregnane-3,20-dione bisoxime having a melting point of 155–160° C., infrared absorption maxima at 3520, 3300 sh., 3240, 3120, 1673 sh., 1663, 1635, 997, 963, 943, 927, 915, 897, and 873 cm.$^{-1}$.

In the same manner following the procedure of Example 1 but substituting for 11α-allyl-11β-hydroxy-5β-pregnane-3,20-dione bis(ethylene ketal) other 3,20-bis(alkylene ketals) of 11α-allyl-11β-hydroxy-5β-pregnane-3,20-dione is productive of 11α-allyl-11β-hydroxy-5β-pregnane-3,20-dione bisoxime.

In the same manner substituting 11α-allyl-11β-hydroxy-5β-pregnane-3,20-dione for 11α-allyl-11β-hydroxy-5β-pregnane-3,20-dione bis(ethylene ketal) and following the procedure of Example 1 is productive of 11α-allyl-11β-hydroxy-5β-pregnane-3,20-dione bisoxime.

EXAMPLE 2

*11α-methallyl-11β-hydroxy-5β-pregnane-3,20 dione bisoxime*

A stoichiometric equivalent amount of 11α-methallyl-11β-hydroxy-5β-pregnane-3,20-dione bis(ethylene ketal) is substituted for 11α-allyl-11β-hydroxy-5β-pregnane-3,20-dione bis(ethylene ketal) in the procedure of Example 1, to obtain 11α-methallyl-11β-hydroxy-5β-pregnane-3,20-dione bisoxime, a crystalline solid.

In the same manner following the procedure of Example 2, but substituting for 11α-methallyl-11β-hydroxy-5β-pregnane-3,20-dione bis(ethylene ketal) other 3,20-bis(alkylene ketals) of 11α-methallyl-11β-hydroxy-5β-pregnane-3,20-dione is productive of 11α-methallyl-11β-hydroxy-5β-pregnane-3,20-dione bisoxime.

In the same manner substituting 11α-methallyl-11β-hydroxy-5β-pregnane-3,20-dione for 11α-methallyl-11β-hydroxy-5β-pregnane-3,20-dione bis(ethylene ketal) and following the procedure of Example 2 is productive of 11α-methallyl-11β-hydroxy-5β-pregnane-3,20-dione bisoxime.

We claim:

1. 11α-allylated 11β-hydroxy-5β-pregnane-3,20-dione bisoxime of the formula:

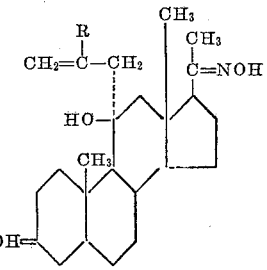

wherein R is selected from the group consisting of hydrogen and methyl.

2. 11α-allyl-11β-hydroxy-5β-pregnane-3,20-dione bisoxime.

3. 11α - methallyl - 11β - hydroxy - 5 - pregnane-3,20-dione bisoxime.

4. A process for the production of 11α-allylated 11β-hydroxy-5β-pregnane-3,20-dione bisoxime of the formula:

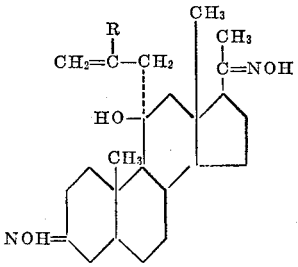

wherein R is selected from the group consisting of hydrogen and methyl, which comprises subjecting a compound of the formula:

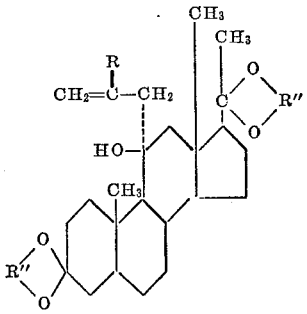

wherein R is selected from the group consisting of hydrogen and methyl, and R″ is an alkylene radical containing not more than eight carbon atoms, inclusive, and the attaching oxygen to carbon bonds are separated by a chain of at least 2 and not more than 3 carbon atoms, to reaction with a hydroxylamine mineral acid salt in the presence of a base to produce the corresponding 11α-allylated 11β-hydroxy-5β-pregnane-3,20-dione bisoxime.

5. A process for the production of 11α-allyl-11β-hydroxy-5β-pregnane-3,20-dione bisoxime which comprises reacting 11α - allyl - 11β - hydroxy - 5β - pregnane - 3,20- dione bis(ethylene ketal) with hydroxylamine hydrochloride in the presence of pyridine to produce 11α-allyl-11β-hydroxy-5-β-pregnane-3,20-dione bisoxime.

6. A process for the production of 11α-methallyl-11β-hydroxy-5β-pregnane-3,20-dione bisoxime which comprises reacting 11α-methallyl-11β-hydroxy-5β-pregnane-3,20-dione bis(ethylene ketal) with hydroxylamine hydrochloride in the presence of pyridine to produce 11α-methallyl-11β-hydroxy-5β-pregnane-3,20-dione bisoxime.

References Cited in the file of this patent

UNITED STATES PATENTS 2,863,885    Babcock  ---------------- Dec. 9, 1958
2,880,218    Hunt et al. ------------ Mar. 31, 1959

OTHER REFERENCES

"Journal of Biological Chem.," vol. 122 (1938), page 433 relied on. Article by Kochakian et al.